United States Patent [19]

Seber

[11] Patent Number: 4,933,231
[45] Date of Patent: Jun. 12, 1990

[54] ABRASION RESISTANT, HIGH STRENGTH COMPOSITE PADDED FABRIC MATERIAL

[75] Inventor: Brett P. Seber, Laguna Niguel, Calif.

[73] Assignee: McGuire-Nicholas Company, Inc., City of Commerce, Calif.

[21] Appl. No.: 306,690

[22] Filed: Feb. 6, 1989

[51] Int. Cl.$^5$ .............................................. B32B 7/00
[52] U.S. Cl. ................................. 422/252; 156/73.1; 428/246; 428/296; 428/304.4
[58] Field of Search ............ 428/246, 252, 296, 304.4; 156/73.1

[56] References Cited

U.S. PATENT DOCUMENTS 4,486,492 12/1984 Ziliotto .............................. 428/252
4,608,298 8/1986 Klaff .................................. 428/246

Primary Examiner—James J. Bell
Attorney, Agent, or Firm—Philip D. Junkins

[57] ABSTRACT

An abrasion and tear resistant, high strength composite laminated padded fabric material for use in the fabrication of tradesmen and craftsmen work items such as aprons and nail bags, tool pouches and tool holders, cordless tool holsters, belts and back support pads, knee pads and the like. The composite fabric material of the invention is a heat and pressure formed double laminate of like outer primary layers of tight-woven threads of high-tenacity nylon fibers and an intermediate padding layer of cross-linked, high-density, closed-cell or open-cell, flexible synthetic polymer foam. The composite laminated fabric material is formed by first bonding one of the outer nylon fabric layers to one side of the intermediate foam layer and thereafter bonding the other outer nylon fabric layers to the other side of the intermediate foam layer.

15 Claims, 1 Drawing Sheet

ABRASION RESISTANT, HIGH STRENGTH COMPOSITE PADDED FABRIC MATERIAL

BACKGROUND OF THE INVENTION

1. Field of the Invention

The present invention relates to fabric material to be utilized in the fabrication of items which are normally subjected to abrasion, punctures and tears during extended periods of use. More particularly, the invention relates to abrasion resistant, high strength composite padded fabric material for use in the fabrication of carpenters aprons and nail bags, tool pouches and tool holders, cordless tool holsters, belts and back support pads, knee pads, and the like.

2. Description of the Prior Art

Classically, tradesmen of many skill and vocational classifications have used tool pouches and tool holders, nail bags and aprons, belts and back support pads, tool holsters and other body supported and carried items fabricated out of leather, i.e., principally high grade cow hide material. Such material, when properly tanned, exhibits high tensil strength and longevity and is tough, non-abrasive and tear resistant in the context of rugged use by professional construction workers. Further, such material has been found to hold at its high stress seam areas joined by single or double stitching and/or rolled rivets. However, leather items for tradesmen are costly and they are heavy leading to sore hips, tired legs and aching backs.

In recent years, numerous attempts have been made to lighten up tradesmen's tool carrying apparel and items through the use in their fabrication of various fabrics including heavy weave canvas materials and nylon and polypropylene thread woven fabrics. Such materials have proven to be objectionable as not assuring product longevity and durability.

It is an object of the present invention to provide an improved fabric material for use in the fabrication of tradesmen aprons and nail bags, tool pouches and tool holders, belts and back supports, cordless tool holsters, knee pads, and related items with such material being relatively soft to the human touch.

It is a further object of the invention to provide an improved composite padded fabric material for use in the fabrication of tradesmen items which are normally subjected to high abrasion, punctures and tears during extended periods of use.

It is still a further object of the invention to provide an improved laminated padded fabric material for use in the fabrication of carpentry and construction worker aprons and nail bags, tool pouches and tool holders, belts and back supports and other items and which exhibits high abrasion, puncture and tear resistance and high strength characteristics over long periods of use with such material buffering the force of impacts and blows.

It is another object of the invention to provide an improved double laminated padded fabric material for use in the fabrication of tradesmen items and which exhibits high strength and high stress resistance in the areas of stitched fabrication seams and rivet affixation.

Other objects and advantages of the invention will be apparent from the following summary and detailed descriptions of the invention, taken together with the accompanying drawing figures.

SUMMARY OF THE INVENTION

The present invention relates to an improved composite fabric material for use in the fabrication of carpentry and other tradesmen aprons and nail bags, tool pouches and tool holders, belts and back supports, cordless tool holsters, knee pads, and other related items, and which exhibits high abrasion, puncture and tear resistance, high overall strength, and substantial flexibility characteristics over long periods of rugged use. The composite fabric material of the invention is comprised of a heat and pressure formed double laminate of like outer primary layers of tight-woven threads of high-tenacity nylon fibers and an intermediate padding layer of cross-linked, high-density, closed-cell or open-cell, flexible synthetic polymer foam.

In the fabrication of the composite fabric material of the invention the intermediate synthetic polymer foam layer (preferably a closed-cell polyethylene copolymer) is initially bonded to a first outer woven nylon fabric layer by heating a first side of the foam layer to the point that the face of the heated side of such layer reaches its melting point temperature and thereafter interfacing the heated side of such layer with a first outer fabric layer under pressure. Thereafter, a second side of the foam layer is heated to the point that the face thereof reaches its melting point temperature followed by the interfacing of the second side of the foam layer with a second outer woven nylon fabric layer under pressure. The face heating of the intermediate foam layer, during the double laminate fabrication methodology, may be accomplished by flame heating, infrared radiation heating or ultrasonic heating.

Alternatively, the composite fabric material of the invention may be fabricated by adhesively bonding, in sequence, the outer woven nylon fabric layers to the intermediate padding layer of foam material under pressure with the application of heat. The adhesive which bonds the outer woven fabric layers to the intermediate foam layer may be a hot melt, solvent based or aqueous based adhesive. Thus, latex based and acrylic, polyester and polyamide based adhesives, along with a variety of other thermoplastic synthetic adhesives are suitable for binding the outer layers to the intermediate layer to form the double laminate material of the invention.

The composite material of the invention, as a double laminate padded fabric material exhibits exceptional resistance to abrasion, punctures and tears, high overall strength, and substantial flexibility characteristics over long periods of rugged use in the form of tradesmen aprons, bags, pouches, tool holders, belts, holsters, knee pads, and other related items. The intermediate foam padding layer of the composite material may range from about 0.8 mm to about 3.6 mm in thickness with the final double laminate of the material having a thickness range of from about 1.2 mm to about 4.8 mm.

BRIEF DESCRIPTION OF THE DRAWING FIGURES

FIG. 1 is an enlarged sectional view of a composite double laminated piece of the fabric material of the present invention with the outer woven fabric layers bonded to the intermediate foam padding layer;

FIG. 2 is a somewhat diagrammatic showing of one method of applying and bonding the outer woven nylon fabric layers to the intermediate foam layer to form the composite laminated fabric material of the invention; and FIG. 3 is a somewhat diagrammatic showing of an alternative method of applying and bonding the outer woven nylon fabric layers to the intermediate foam layer to form the composite laminated fabric material of the invention.

DETAILED DESCRIPTION OF PREFERRED EMBODIMENTS

The basic components of the abrasion resistant, high strength composite padded fabric material of the present invention are outer fabric layers formed of tight-woven threads formed of high-tenacity nylon fibers and an intermediate padding layer of cross-linked, high-density, flexible synthetic polymer foam. The characteristics of the inner foam layer and outer woven fabric layers must be carefully matched in order to provide (when bonded together as a double laminate) a composite material that is highly flexible without separation of the laminated layers upon long-term exposure to rugged abrasion wear and tear use when formed into tradesmen aprons, nail bags, tool pouches and holders, belts and back supports, tool holsters, knee pads and related other items.

The intermediate laminate layer of synthetic polymer foam material (of open or closed cell structure) may be formed of homopolymers and copolymers of polyethylene, polyurethane, or of a vinyl-based polymer. The foam must be cross-lined and must be flexible and capable of being formed into sheets of 4 mm thickness or less. A preferred closed-cell polyethylene foam of 1.6 mm thickness has a tensile strength of 620 g/cm of width and may be elongated 250% to its break point. The outer laminate layers of tight-woven fabric material is preferably woven of threads of high-tenacity nylon fibers (1350/560 denier) exibiting outstanding durability with respect to abrasion, puncture and tear forces.

Figure 1:
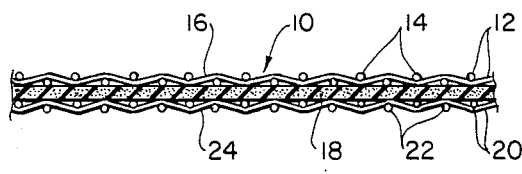

Referring now to FIG. 1 of the drawing, the composite laminated padded fabric material 10 of the invention comprises a double laminate of a first outer fabric layer 12 formed of tight-woven warp threads 14 and weft threads 16 of high-tenacity nylon fibers, an intermediate padding layer 18 of cross-linked, high-density synthetic polymer foam, and a second outer fabric layer 20 also formed of tight-woven warp threads 22 and weft threads 24 of high-tenacity nylon fibers. The outer fabric layers 12 and 20 are bonded to the intermediate layer 18 as described hereinafter.

Figure 2:
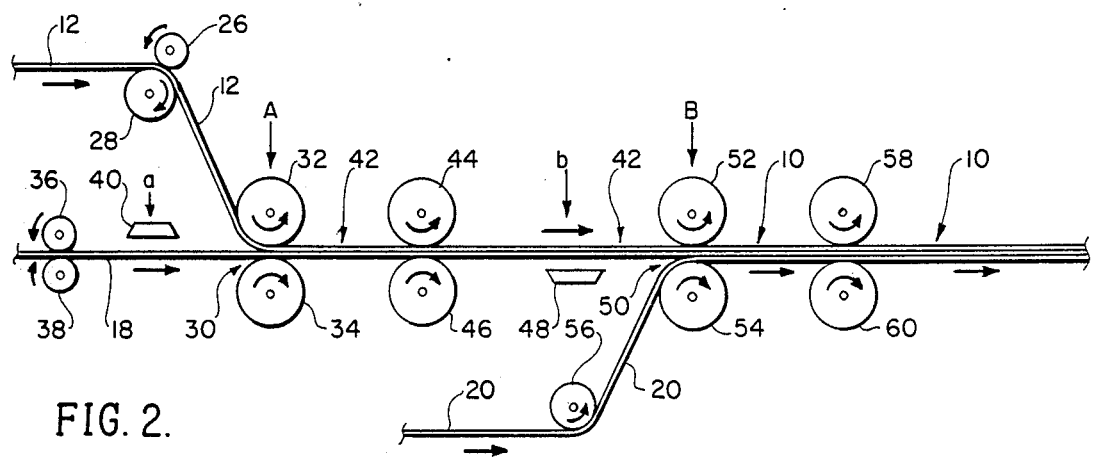

In FIG. 2 there is illustrated, in somewhat diagrammatic fashion, a first alternative method of applying and bonding the outer fabric layers 12 and 20 to the intermediate synthetic foam layer 18 to form the composite laminated padded fabric material 10 of the invention as shown in FIG. 1. In accordance with the methodology illustrated in FIG. 2 a first web of tight-woven nylon fabric 12 is fed as an outer laminate layer between web transport or guide rolls 26 and 28. One or both of these rolls may be heated so that the fabric material 12 is preheated prior to its interfacing application to the intermediate layer 18. The first nylon fabric web 12 is then directed to a pressure nip 30 of a bonding station A comprised of opposed pressure rolls 32 and 34. A web of cross-linked, high-density synthetic polymer foam 18 is fed between web transport or guide rolls 36 and 38 and moved through a heating station "a" which includes a heater 40 for heating the upper surface of web 18 to its melting point temperature thereby softening such surface. The heater 40 may be a flame heater, bank of infrared heating panels or ultrasonic heater, all of known design and construction and providing highly controlled surface heating of the moving web 18. The foam web 18 is then directed immediately to the pressure nip 30 of bonding station A to interface under pressure with the first web of nylon fabric 12 to form a first laminated web 42. The pressure rolls 32 and 34 of bonding station A may be heated to assure that bonding of the webs 12 and 18 is uniform and complete. The laminated web 42 is thereafter fed to and through one or more additional pairs of opposed rotatable pressure rolls 44 and 46 at ambient temperature whereby the laminated web is cooled to below the fusing temperature of the foam material.

The first or single laminated web 42 is next moved through a heating station "b" which includes a heater 48 for heating the lower surface of web 42, i.e., the lower surface of the intermediate synthetic foam layer 18, to its melting point temperature thereby softening such surface. As in the case of heater 40, the heater 48 may be a flame heater, bank of infrared panels or ultrasonic heater of known design for controlled uniform heating of the lower surface of foam layer 18 of web 42. The first laminated web 42 is then directed immediately to a pressure nip 50 of a bonding station B comprised of opposed pressure rolls 52 and 54. A second web of tight-woven nylon fabric 20 (tensioned over a preheat guide roll 56) is directed to the pressure nip 50 of bonding station B to interface, under the pressure of rolls 52 and 54, with the heated lower surface of first laminated web 42 to form the double laminated web 10. The pressure rolls 52 and 54 of bonding station B may be heated to assure complete bonding of fabric web 20 to the heated lower surface of the foam laminate 18 component of web 42. The resulting double laminate 10 comprising the composite padded fabric material of the present invention, is thereafter fed to and through one or more additional pairs of opposed rotatable pressure rolls 58 and 60 at ambient temperature whereby the laminated web 10 is cooled to below the fusing temperature of the intermediate layer 18 of foam material.

Figure 3:
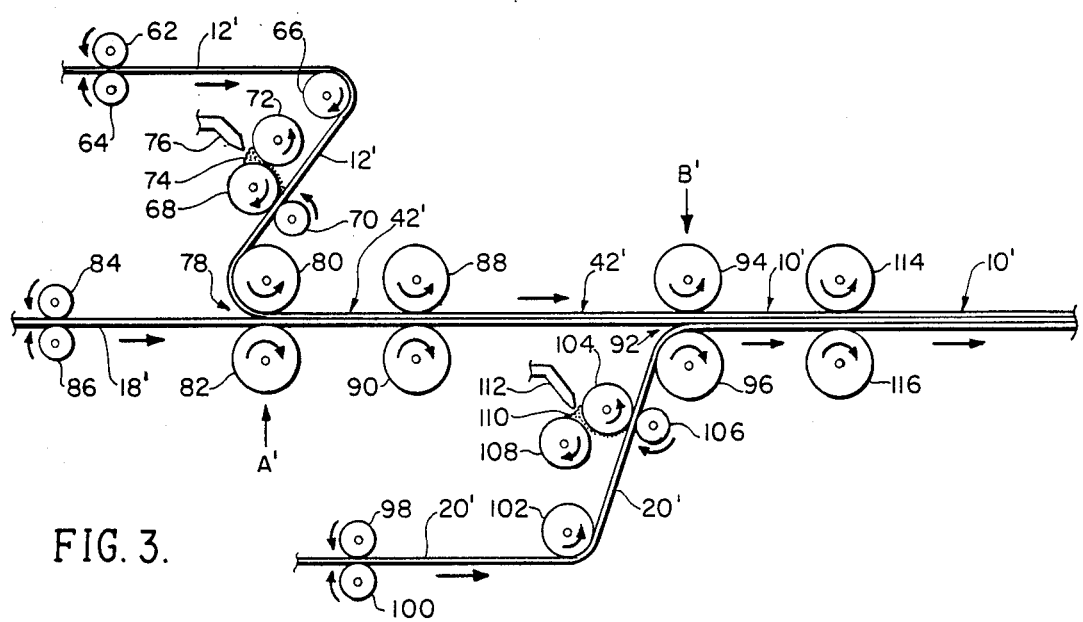

In FIG. 3 there is illustrated, in somewhat diagrammatic fashion, a second alternative method of applying and bonding the outer woven nylon fabric layers 12' and 20' to the intermediate synthetic foam layer 18' to form the composite laminated padded fabric material 10' of the invention (shown in FIG. 1 as material 10). In accordance with the methodology illustrated in FIG. 3 a first web of tight-woven nylon fabric 12' is fed between web transport or guide rolls 62 and 64 and over pre-heat roll 66. The pre-heated first fabric web 12' is then directed between a heated, etched-surface roll 68 and an idler roll 70 which rotatably holds the fabric web 12' to roll 68. An upper heated roll 72 rotatably interacts with heater roll 68 to calender a laminate bonding adhesive material 74 introduced to such rolls by a suitable feed device 76. A thin heated viscous calendered coating of adhesive material is carried by roll 68 to the laminate interface surface of woven fabric web 12' whereat it is applied to the outermost contact areas and points of the warp and weft threads of the fabric surface in a uniform printed-on pattern of minute adhesive deposit points. After the application of adhesive 74 to the laminate interface surface of the fabric web 12', such web is directed immediately to the pressure nip 78 of a bonding station A' comprised of opposed pressure rolls 80 and 82. A web of cross-linked, high-density synthetic polymer foam 18' is moved between web transport or guide rolls 84 and 86 (as an intermediate laminate layer) and fed to the pressure nip 78 of bonding station A' whereat the web 18' is interfaced (under pressure and precisely controlled heat) to the adhesive-coated woven fabric web 12' to form a first laminated web 42'. The laminated web 42' is thereafter fed to and through one or more additional pairs of opposed rotatable pressure rolls 88 and 90 at ambient temperature whereby the laminated web is cooled to below the fusing temperature of the adhesive material.

The first or single laminated web 42' is next moved to a pressure nip 92 of a bonding station B' comprised of opposed heated pressure rolls 94 and 96. A second web of tight-woven nylon fabric 20' is fed between web transport or guide rolls 98 and 100 and over pre-heat roll 102. The pre-heated second fabric web 20' is then directed between a heated, etched-surface roll 104 and an idler roll 106 which rotatably holds the fabric web 20' to roll 104. A lower heated roll 108 rotatably interacts with heated roll 104 to calender a laminate bonding adhesive material 110 introduced to such roll by a suitable feed device 112. A thin heated viscous calendered coating of adhesive material is carried by roll 104 to the laminate interface surface of woven fabric web 20' whereat it is applied to the outermost contact areas and points of the warp and weft threads of the fabric surface in a pattern of minute adhesive deposit points or as a full web coating. After the application of adhesive 110 to the laminate interface surface of the fabric web 20', such web is directed immediately to the pressure nip 92 of bonding station B' whereat the laminate web 42' is interfaced (under pressure and precisely controlled heat) to the adhesive-coated woven fabric web 20' to form the double laminate web 10' comprising the composite padded fabric material of the invention. The double laminated web 10' is thereafter fed to and through one or more additional pairs of opposed rotatable pressure rolls 114 and 116 at ambient temperature whereby the fully laminated web 10' is cooled to below the fusing point temperature of the adhesive material.

Where the composite padded fabric material of the invention is fabricated in accordance with the methodology illustrated in FIG. 2, and the intermediate layer of cross-linked, high-density synthetic polymer foam is first surface heated on one side and laminated to a first outer woven nylon fabric layer and thereafter surface heated on its other side and laminated to a second outer woven nylon fabric layer, the temperature to which the foam surfaces are heated range between 300° F. and 400° F. Further, where the composite padded fabric material of the invention is fabricated in accordance with the methodology illustrated in FIG. 3, and the intermediate polymer foam layer is bonded on each of its two face surfaces to outer woven nylon fabric layers by an adhesive, such adhesive may be a hot melt, solvent based or aqueous based adhesive. Depending upon the particular adhesive, the bonding temperature will be within the range of ambient temperature to 450° F. and the viscosity of the adhesive will be within the range of 500 to 5,000 centipoise. The adhesive may be applied in printed-on fashion to the interfacing side of each outer woven nylon fabric layer as illustrated in FIG. 3, may be sprayed onto such outer layers before they are interfaced with the intermediate foam layer, or may be applied by known knife-over-roller techniques.

A broad selection of abrasion resistant, high strength composite padded fabric materials have been fabricated in accordance with the invention in yardage and bolt quantities. The synthetic polymer foam materials utilized as the intermediate padding layer have included open and closed-cell foams formed of homopolymers and copolymers of polyethylene, polyurethane, or of vinyl-based polymers. The foam must be cross-linked to assure long and stable product life and must be flexible and capable of being formed into sheets of 4 mm thickness or less with smooth surface characteristics. A preferred foam material is polyethylene homopolymer or copolymer of closed-cell type marketed by Voltek, Inc. under the trademark "VOLARA." VOLARA Type E foam (irradiation cross-linked) is of particular interest. In a 3.2 mm thickness, it has a tensile strength of 1260 g/cm width and may be elongated 300% to its break point. Another suitable foam is a chemically cross-linked polyethylene foam marketed by H.U.L.S. under the trademark "TROCHELLAN." Also suitable is a cross-linked polyethylene foam marketed by the Frelen Corporation under the trademark "FRELEN."

The outer layers of the composite padded fabric materials of the invention are preferably made of tight-woven threads of high-tenacity nylon fibers. Of particular suitability for fabrication of the composite material is the family of nylon fabrics marketed by DuPont Company under the trademarks "CORDURA" and "CORDURA PLUS" and available in weaves of 20 to 30 warp threads and 16 to 22 weft threads per inch with the threads being of 1000/280 or 1340/560 denier. CORDURA PLUS, with more nylon fibers per thread, is softer to the touch than CORDURA. The abrasion resistance of CORDURA PLUS is four times that of standard nylon fabric, twenty times that of cotton duck fabric, and three times that of woven polypropylene fabrics. The material is stain and water resistant and can be provided with a teflon coating to make the end composite fabric material of the invention substantially waterproof.

In addition to exhibiting high abrasion, puncture and tear resistance, high overall strength, and substantial flexibility characteristics, the composite laminated material of the invention is exceptionally suitable for fabricating tradesmen work items because the material has a soft feel and is less abrasive to tradesmen's skin surfaces and (with its intermediate foam padding layer) buffers the force of impacts and blows to the work items. These items, including pouches, bags, tool holders, belts, back supports, tool holsters and the like, require during their manufacture single and double stitching and/or the placement of rolled rivets for making and holding seems, attachment loops, pockets and straps which are subject to high stresses.

In the specification and drawing figures there has been set forth preferred embodiments of the invention and although specific terms have been employed, they are used in a generic and descriptive sense only and not for purposes of limitation, the scope of the invention being defined in the following claims.

What is claimed is:

1. An abrasion and tear resistant, high strength composite laminated padded fabric material for use in the fabrication of tradesmen and craftsmen work items and apparel comprised of:
   (a) first and second outer primary layers of tight-woven threads of high-tenacity nylon fibers; and
   (b) an intermediate synthetic polymer foam layer coextensive with said outer primary layers and permanently bonded to the threads thereof, said intermediate layer consisting of a synthetic polymer foam material selected from the group of closed and open-cell, cross-linked foam materials formed of homopolymers and copolymers of polyethylene, polyurethane, and vinyl-based polymers, and said intermediate layer having a substantially uniform thickness within said laminated fabric material of from about 0.8 mm to about 3.6 mm.

2. An abrasion and tear resistant, high strength composite laminated padded fabric material as claimed in claim 1 wherein the intermediate foam layer is a closed-cell, cross-linked polyethylene homopolymer or copolymer and said layer has a tensile strength of at least 35 g/mm$^2$ of cross-sectional area and may be elongated at least 100% to its break point.

3. An abrasion and tear resistant, high strength composite laminated padded fabric material as claimed in claim 1 wherein the first and second outer primary layers are formed of tight-woven nylon threads having a denier in the range of 1000/280 to 1350/560 and the intermediate foam layer is selected from the group of closed-cell and open-cell foams formed of homopolymers and copolymers of polyethylene, polyurethane, and vinyl-based polymers, said composite laminated fabric material having a thickness in the range of about 1.2 mm to about 4.8 mm.

4. An abrasion and tear resistant, high strength composite laminated padded fabric material as claimed in claim 1 wherein the first and second outer primary layers are bonded to the intermediate foam layer by heat fusion of the outer surfaces of said foam layer to the threads of said outer layers.

5. An abrasion and tear resistant, high strength composite laminated padded fabric material as claimed in claim 1 wherein the first and second outer primary layers are bonded to the intermediate foam layer by an adhesive applied to the laminate interface surfaces of said primary layers and cured by heat and pressure applied to said primary layers with the intermediate foam layer interposed therebetween.

6. An abrasion and tear resistant, high strength composite laminated padded fabric material as claimed in claim 5 wherein the adhesive is selected from the group comprising hot melt, solvent based and aqueous based thermoplastic adhesives.

7. A method of producing an abrasive and tear resistant, high strength composite laminated padded fabric material for use in the fabrication of tradesmen and craftsmen work items and apparel which comprises:
(a) bonding a first outer primary fabric layer of tight-woven threads of high-tenacity nylon fibers to a coextensive first surface of an intermediate layer of synthetic polymer foam selected from the group of closed-cell and open-cell foams formed of homopolymers and copolymers of polyethylene, polyurethane, and vinyl-based polymers; and
(b) bonding a second outer primary fabric layer of tight-woven threads of high-tenacity nylon fibers to the coextensive opposite surface of said intermediate foam layer to form said laminated fabric material, said intermediate foam layer having a substantially uniform thickness within said laminated fabric material in the range of from about 0.8 mm to about 3.6 mm, and said laminated fabric material having an overall thickness in the range of about 1.2 mm to about 4.8 mm.

8. A method of producing an abrasive and tear resistant, high strength composite laminated padded fabric material as claimed in claim 7 wherein said intermediate foam layer is a closed-cell, cross-linked polyethylene homopolymer or copolymer and has a tensile strength of at least 35 g/mm$^2$ of cross-sectional area and may be elongated at least 100% to its break point.

9. A method of producing an abrasive and tear resistant, high strength composite laminated padded fabric material as claimed in claim 7 wherein the bonding of said first outer fabric layer to the first surface of said intermediate foam layer is accomplished by first heating said foam layer surface to its fusion temperature and thereafter interfacing said first fabric layer therewith under pressure and the bonding of said second outer fabric layer to the opposite surface of said intermediate foam layer is accomplished by first heating said foam layer surface to its fusion temperature and thereafter interfacing said second fabric layer therewith under pressure.

10. A method of producing an abrasive and tear resistant, high strength composite laminated padded fabric material as claimed in claim 9 wherein the successive heating of the first and opposite surfaces of said intermediate foam layer is accomplished by heating methods selected from the group consisting of surface flaming, infrared heating and ultrasonic energy heating.

11. A method of producing an abrasive and tear resistant, high strength composite laminated padded fabric material as claimed in claim 7 wherein the bonding of said first outer fabric layer to the first surface of said intermediate foam layer is accomplished by first applying an adhesive to a side of said first fabric layer and thereafter interfacing said first fabric layer in its side bearing said adhesive with the first surface of said intermediate foam layer under pressure and the bonding of the second outer fabric layer to the opposite surface of said intermediate foam layer is accomplished by first applying an adhesive to a side of said second fabric layer and thereafter interfacing said second fabric layer in its side bearing said adhesive with the opposite surface of said intermediate foam layer under pressure.

12. A method of producing an abrasive and tear resistant, high strength composite laminated padded fabric material as claimed in claim 11 wherein the adhesive for bonding said first fabric layer to said intermediate layer and for bonding said second fabric layer to said intermediate layer is an adhesive selected from the group consisting of hot melt, solvent based and aqueous based thermoplastic adhesives.

13. A method of producing an abrasive and tear resistant, high strength composite laminated padded fabric material for use in the fabrication of tradesmen and craftsmen work items and apparel, said composite laminated fabric material consisting of first and second outer primary fabric layers of tight-woven threads of high-tenacity nylon fabers each bonded to a coextensive intermediate layer of synthetic polymer foam selected from the group of closed-cell and open-cell foams formed of homopolymers and copolymers of polyethylene, polyurethane and vinyl-based polymers, said method comprising:
(a) heating a first surface of a moving web of said intermediate foam layer to its fusion temperature;
(b) interfacing a moving web of said first outer primary fabric layer with the heated first surface of the moving web of said intermediate foam layer under pressure to bond said first outer primary fabric layer to said intermediate foam layer and form a first laminated moving web of said layers;

(c) heating the second surface of the intermediate foam layer of the first laminated moving web to its fusion temperature; and (d) interfacing a moving web of said second primary fabric layer with the heated second surface of the first laminated moving web under pressure to bond said second outer primary fabric layer to said intermediate foam layer and thereby form a double laminated moving web of said composite laminated padded fabric material.

14. A method of producing an abrasive and tear resistant, high strength composite laminated padded fabric material as claimed in claim 13 wherein said intermediate foam layer is a closed-cell, cross-linked polyethylene homopolymer or copolymer and has a tensile strength of at least 35 g/mm$^2$ of cross-sectional area and may be elongated at least 100% to is break point.

15. A method of producing an abrasive and tear resistant, high strength composite laminated padded fabric material as claimed in claim 13 wherein the successive heating of the first and second surfaces of said intermediate foam layer is accomplished by heating methods selected from the group consisting of surface flaming, infrared heating and ultrasonic energy heating.

* * * * *